US 10,302,208 B2

(12) United States Patent
Lamb et al.

(10) Patent No.: US 10,302,208 B2
(45) Date of Patent: May 28, 2019

(54) CONTROL VALVE WITH EXTERNAL RELIEF BIAS MEMBER

(71) Applicant: Rostra Vernatherm, LLC, Bristol, CT (US)

(72) Inventors: Kevin W. Lamb, West Hartford, CT (US); Kenneth Lionello, Waterbury, CT (US)

(73) Assignee: Rostra Vernatherm, LLC, Bristol, CT (US)

( * ) Notice: Subject to any disclaimer, the term of this patent is extended or adjusted under 35 U.S.C. 154(b) by 17 days.

(21) Appl. No.: 15/369,736

(22) Filed: Dec. 5, 2016

(65) Prior Publication Data

US 2018/0156346 A1 Jun. 7, 2018

(51) Int. Cl.
| | |
|---|---|
| *F01P 7/16* | (2006.01) |
| *F16K 1/12* | (2006.01) |
| *F01P 11/18* | (2006.01) |
| *F16K 11/07* | (2006.01) |
| *F16K 17/00* | (2006.01) |
| *F16K 31/00* | (2006.01) |
| *F16K 31/06* | (2006.01) |
| *G05D 23/02* | (2006.01) |
| *G05D 23/13* | (2006.01) |

(52) U.S. Cl.
CPC .............. *F16K 17/003* (2013.01); *F01P 7/16* (2013.01); *F16K 1/12* (2013.01); *F16K 11/0716* (2013.01); *F16K 31/002* (2013.01); *F16K 31/0613* (2013.01); *G05D 23/021* (2013.01); *G05D 23/022* (2013.01); *G05D 23/1333* (2013.01); *F01P 11/18* (2013.01)

(58) Field of Classification Search
CPC .. G05D 23/021; G05D 23/023; F05D 23/022; F16K 31/002; F16K 31/0613; F16K 11/0716
USPC .................. 236/34.5, 99 K, 93 A, 99 R, 99 J
See application file for complete search history.

(56) References Cited

U.S. PATENT DOCUMENTS

| | | | | |
|---|---|---|---|---|
| 2,742,230 | A | * | 4/1956 | Herbert ................ G05D 23/132 |
| | | | | 236/12.22 |
| 2,873,069 | A | * | 2/1959 | Matthews ........... F16K 31/0679 |
| | | | | 137/66 |

(Continued)

FOREIGN PATENT DOCUMENTS

| | | | | |
|---|---|---|---|---|
| DE | 2421810 | A1 * | 11/1975 | .......... G05D 23/023 |
| DE | 3718743 | C1 * | 11/1988 | ......... G05D 23/1333 |

*Primary Examiner* — Cassey D Bauer
*Assistant Examiner* — Jenna M Hopkins
(74) *Attorney, Agent, or Firm* — Alix, Yale & Ristas, LLP (57) ABSTRACT

A thermally actuated flow control valve mounted to a housing to control fluid flow based on temperature is provided. The control valve has a relief bias member in a cap projecting outside of the housing. Within the housing, the control valve has an actuator extending into a return bias container and a valve member. The actuator includes a thermally responsive material that expands and contracts in response to fluid flow over a predetermined range of temperatures. The actuator extends to close the valve member against a valve seat within the housing when the thermally responsive material expands. A return member moves the valve member away from the valve seat when the thermally responsive material contracts. The return bias container allows the relief bias member to accommodate pressures and temperatures beyond the predetermined range.

18 Claims, 5 Drawing Sheets

(56) References Cited

U.S. PATENT DOCUMENTS

| | | | | |
|---|---|---|---|---|
| 3,454,220 | A * | 7/1969 | Bentz | G05D 23/022 236/100 |
| 3,554,440 | A * | 1/1971 | Austin | F16H 57/0413 236/34.5 |
| 4,288,033 | A * | 9/1981 | Wisyanski | G05D 23/134 236/100 |
| 4,460,006 | A * | 7/1984 | Kolze | E03B 7/12 126/588 |
| 4,460,007 | A * | 7/1984 | Pirkle | F16K 17/38 137/62 |
| 4,560,104 | A * | 12/1985 | Nagumo | F01P 7/167 236/34.5 |
| 4,878,512 | A * | 11/1989 | Pirkel | F16K 17/38 137/62 |
| 5,018,664 | A * | 5/1991 | Butler | F01P 7/16 236/34.5 |
| 5,961,037 | A * | 10/1999 | Fiedler | G05D 23/022 236/34.5 |
| 6,318,405 | B1 * | 11/2001 | Brandt | G05D 16/0663 137/484.2 |
| 6,386,150 | B1 * | 5/2002 | Iwaki | G05D 23/022 123/41.1 |
| 6,719,208 | B2 * | 4/2004 | Brown | F01M 5/007 236/34.5 |
| 6,772,958 | B1 * | 8/2004 | Lamb | F01P 7/16 236/100 |
| 6,772,959 | B2 * | 8/2004 | Cardinali Ieda | G05D 23/022 236/34.5 |
| 6,988,364 | B1 * | 1/2006 | Lamb | F16K 31/002 60/508 |
| 7,299,994 | B2 * | 11/2007 | Brown | F01M 5/007 236/34.5 |
| 7,469,841 | B1 * | 12/2008 | Lamb | F03G 7/06 236/100 |
| 7,540,431 | B2 * | 6/2009 | Kozdras | G05D 23/1333 137/535 |
| 7,617,700 | B2 * | 11/2009 | Lamb | G05D 23/022 165/297 |
| 8,141,790 | B2 * | 3/2012 | Sheppard | F01P 7/16 236/100 |
| 8,490,885 | B2 * | 7/2013 | Lamb | F16K 31/002 236/93 R |
| 8,544,762 | B1 * | 10/2013 | Onishi | F16K 31/002 236/100 |
| 8,708,243 | B2 * | 4/2014 | Cameron | F16K 31/002 236/101 D |
| 8,820,655 | B2 * | 9/2014 | Arai | F02M 1/12 236/100 |
| 8,991,719 | B2 * | 3/2015 | Sheppard | F01M 5/007 165/103 |
| 9,133,952 | B2 * | 9/2015 | Lamb | F16K 11/044 |
| 9,140,373 | B2 * | 9/2015 | Franz | F16K 17/38 |
| 9,298,195 | B2 * | 3/2016 | Lamb | G05D 23/022 |
| 9,410,536 | B2 * | 8/2016 | Lamb | F03G 7/06 |
| 9,541,211 | B2 * | 1/2017 | Qiu | G05D 23/1333 |
| 9,690,305 | B2 * | 6/2017 | Lamb | G05D 23/134 |
| 9,829,115 | B2 * | 11/2017 | Cho | F16K 31/002 |
| 10,054,963 | B2 * | 8/2018 | Lamb | G05D 23/12 |
| 2003/0136855 | A1 * | 7/2003 | Brown | F01M 5/007 236/101 R |
| 2003/0150923 | A1 * | 8/2003 | Leu | F01P 7/167 236/34.5 |
| 2006/0108435 | A1 * | 5/2006 | Kozdras | G05D 23/1333 236/93 R |
| 2007/0290056 | A1 * | 12/2007 | Fishman | F01P 7/16 236/34.5 |
| 2008/0223316 | A1 * | 9/2008 | Banta | F01P 7/16 123/41.1 |
| 2009/0107137 | A1 * | 4/2009 | Lionello | F16K 31/002 60/508 |
| 2010/0032594 | A1 * | 2/2010 | Lamb | F16K 31/002 251/11 |
| 2010/0126594 | A1 * | 5/2010 | Sheppard | F01P 7/16 137/340 |
| 2011/0186763 | A1 * | 8/2011 | Lamb | F16K 5/06 251/315.01 |
| 2013/0334327 | A1 * | 12/2013 | Lamb | F03G 7/06 236/99 K |
| 2014/0131460 | A1 * | 5/2014 | Lamb | G05D 23/022 236/99 K |
| 2015/0315941 | A1 * | 11/2015 | Kim | F01M 5/007 236/34.5 |
| 2015/0316939 | A1 * | 11/2015 | Lamb | G05D 23/12 236/101 R |
| 2015/0369113 | A1 * | 12/2015 | Arbel | F01P 7/16 236/34.5 |
| 2016/0018831 | A1 * | 1/2016 | Lamb | G05D 23/134 236/12.1 |

* cited by examiner

Figure 4B

CONTROL VALVE WITH EXTERNAL RELIEF BIAS MEMBER

BACKGROUND OF THE DISCLOSURE

The present disclosure relates to thermally actuated flow-control valves. More particularly, the present disclosure relates to valves including wax-filled actuators employed to control the flow of coolant to heat producing components in engine systems.

The wax actuator conventionally comprises a rigid housing surrounding a reservoir filled with wax formulated to transition from solid to liquid in response to a predictable increase in temperature. The housing is made of strong, thermally conductive material, such as brass, although other materials may be suitable. A piston is arranged to reciprocate in a guide that defines a bore in communication with the reservoir. A flexible diaphragm, plug, or other seal arrangement may be disposed between the wax and the piston to contain the wax in the reservoir. The wax expands in volume as the wax becomes a liquid, generating a force that is directed into the bore of the guide, and pushes the piston away from the reservoir. Thus, the axial length of the actuator changes according to the temperature of the wax, which is responsive to the temperature of the surrounding environment. Wax-filled actuators are reliable temperature sensitive actuators that require no external energy, such as electricity and are therefore self-contained.

Many systems are designed to operate within a specific temperature range and are equipped with heat exchange assemblies to add or remove heat to maintain the correct operating temperature. It is common to circulate fluid through such systems as a means of transmitting heat from one location to another. For example, it is common to circulate transmission fluid in a motor vehicle transmission through a radiator external to the transmission to remove heat from the transmission to prevent overheating during operation. However, it is also important for the transmission to quickly reach and maintain a minimum operating temperature. Therefore, it is common to equip the transmission with a temperature sensitive valve to alter the flow path of the transmission fluid depending upon the temperature of the fluid. The fluid will have a path bypassing the radiator at fluid temperatures below the minimum operating temperature, and a flow path through the radiator at temperatures approaching a maximum operating temperature. A wax-filled actuator may be employed to move a valve member between a cold position bypassing the radiator and a hot position circulating fluid through the radiator in response to the temperature of the fluid.

Such systems may require the valve member to move in response to fluid pressure regardless of the length of the actuator. It is common to employ a spring or bias member associated with the valve member to allow the valve member to move independently of the actuator piston in situations where pressure relief is required. Wax-filled actuators continue to extend in response to increased temperature, so it may also be necessary to accommodate over-extension of the actuator to prevent damage to the actuator or surrounding structures.

The wax-filled actuator is typically positioned in a housing or aperture filled with the fluid, with variable axial length of the actuator employed to move a valve member to alter the flow path of the fluid. A return spring is positioned to return the piston and valve to the retracted/cold position when the temperature of the fluid falls and the wax returns to its smaller volume. The return spring is selected to overcome the friction of the piston in the axial passage and any linkage or valve associated with the actuator, to ensure reliable return to the retracted/cold position.

While wax-filled actuators have gained wide acceptance in temperature control systems, it can be difficult to configure an actuator and valve to provide adequate valve movement and pressure relief in a compact configuration. This is especially difficult when a relief bias member is incorporated into the control valve that accommodates over-extension of the actuator at temperatures above the normal operating range for the system.

Consequently there exists a need for a simple, compact, and accurate thermally actuated flow-control valve that incorporates pressure relief and over-temperature relief.

SUMMARY

One embodiment of the disclosed control valve positions a pressure relief bias member in a cap projecting outside of the housing in which the control valve is mounted. This configuration reduces the axial penetration of the actuator and valve inside the housing to maximize the valve member movement in a confined space.

The control valve comprises a cap, a return bias container, a relief bias member, an actuator, and a return bias member. The cap extends from a closed end to an open end and defines an interior cavity surrounding a longitudinal axis. The return bias container is at least partially within the cavity and is axially movable therein. The return bias container defines an interior volume with an abutment at a container first end. An interior shoulder defines a guide aperture at a second end of the container. The relief bias member is trapped between the closed end of the cap and the first end of the container. The relief bias member exerts a relief bias force that urges the container away from the closed end of the cap. A first retainer secures the container within the cavity in an operational position. The abutment is movable within the cavity away from the interior shoulder and toward the closed end of the cap to a relief position.

The actuator includes a cup containing material having a volume that changes with changes in temperature. The cup includes a valve member, a guide attached to the cup and defining a bore open at an end facing away from the valve member, a piston axially movable in the bore and arranged to project from the guide. The piston position is responsive to the pressure generated by changes in the volume of the material. The guide includes a second retainer adjacent the open end of the guide. The guide extends into the return bias container through the guide aperture and the piston is in contact with the abutment. The return bias member is within the return bias container and is trapped between the second retainer on the guide and the interior shoulder of the return bias container. The return bias member exerts a bias force that urges the guide towards the abutment.

A pre-determined increase in the temperature of the material results in a pressure acting on the piston that is sufficient to overcome the bias force of the return bias member. This pressure moves the valve member away from the cap from a cold position to a hot position. An increase in temperature beyond this hot position results in a continued increase in the volume of the material. This change in volume causes greater pressure on the piston that compresses the relief bias member, allowing the abutment to move towards the closed end of the cap from the operational position to the relief position.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

With reference to FIGS. 1-4B, wherein like numerals represent similar parts throughout the several figures, a first embodiment of a control valve with a relief bias member outside of a fluid housing is generally designated by the reference numeral 10 (hereafter "control valve 10"). The control valve 10 is configured to provide reliable and efficient control of fluids through a system as the temperature of the fluid in the system changes. The present disclosure primarily describes a control valve 10 for use in fluid systems requiring valve movement that is large relative to the distance between an outer wall and the valve seat of a chamber.

Figure 1:
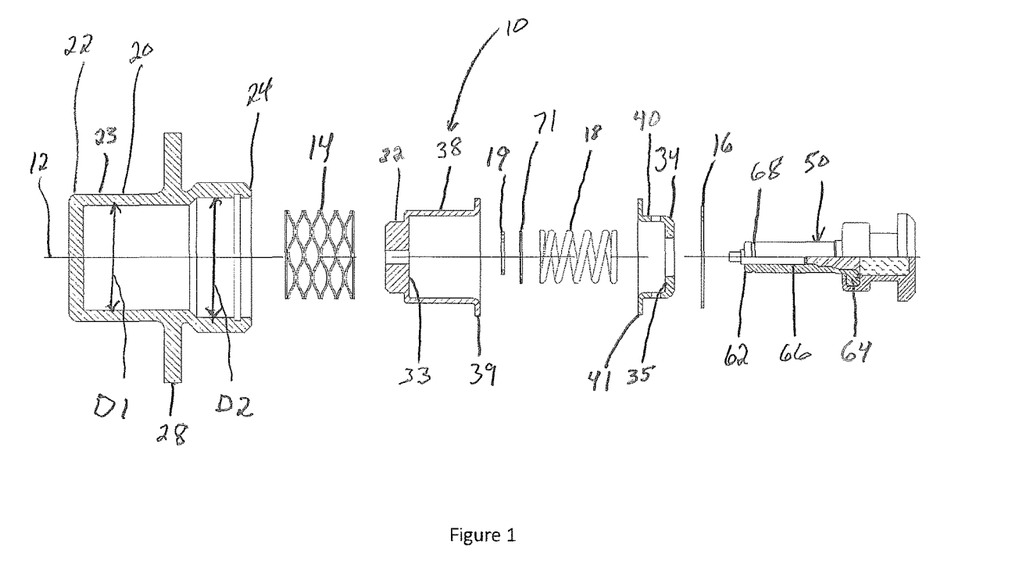
FIG. 1 is a central sectional view of an embodiment of the disclosed control valve with an external relief bias member.
Figure 2:
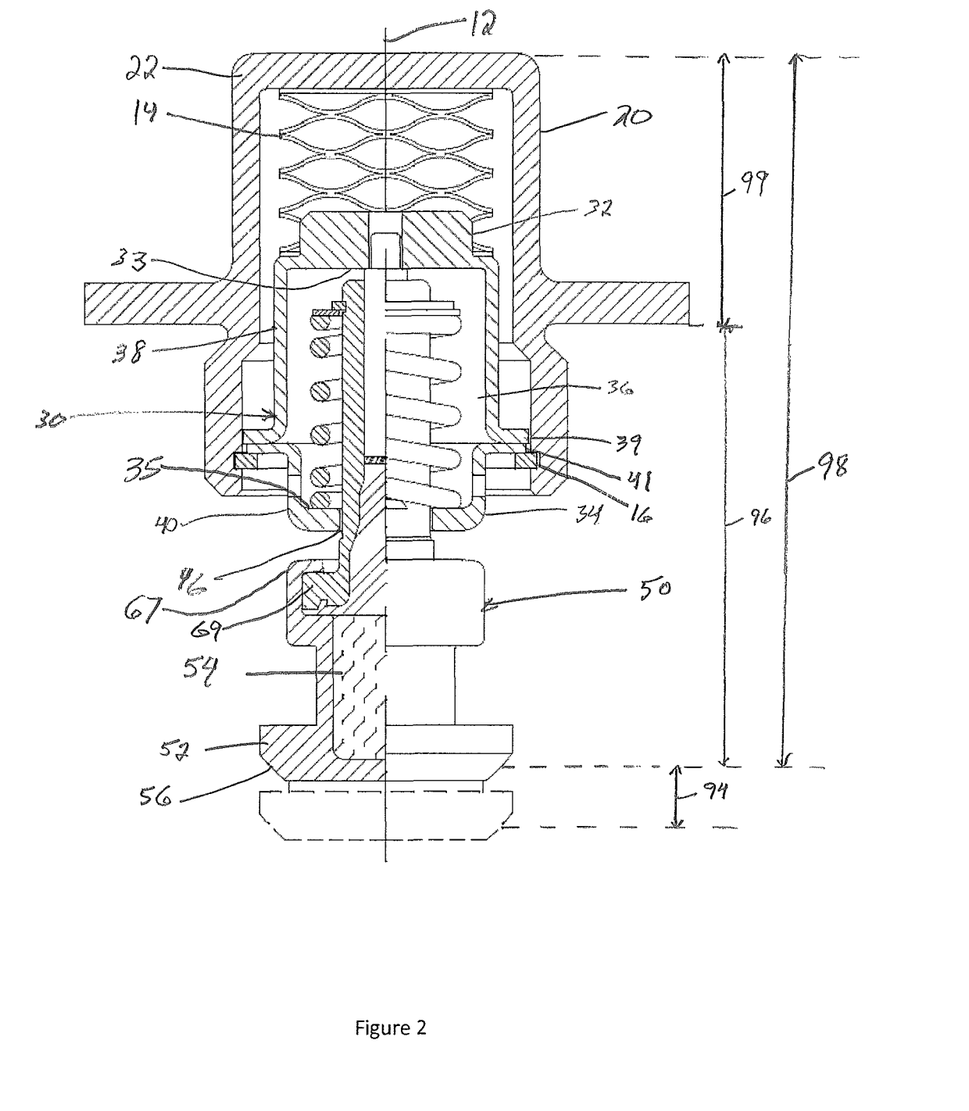
FIG. 2 is a central sectional view of the control valve depicted in FIG. 1 completely assembled.

Referring to one embodiment of the control valve 10, depicted in FIGS. 1 and 2, a cap 20 forms a hollow cylindrical chamber, though other shapes may be used. The cap 20 has a closed end 22 transverse to a longitudinal axis 12 and a side wall 23 that extends axially away from the closed end 22 to an open end 24. The side wall 23 has a first inside diameter D1 and a second inside diameter D2. The depicted cap 20 also has a cap flange 28 that extends in a radial direction from the outer surface of side wall 23 between the closed and open ends 22, 24. The flange 28 is provided to facilitate a secure connection between the control valve 10 and a wall 82 of a chamber 80 (depicted in FIGS. 4A and 4B) and defines the axial position of the control valve 10 within the chamber 80.

Figure 4A:
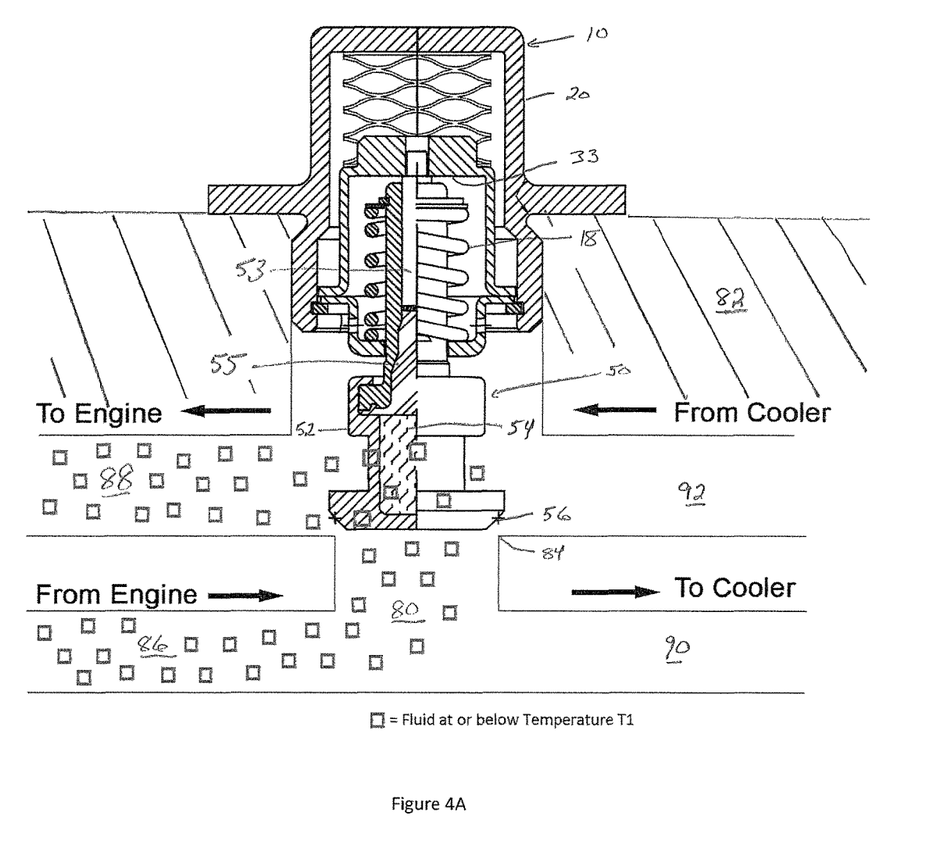
FIG. 4A is a central sectional view of the control valve depicted in FIG. 2 in an open (cold) state within a temperature control chamber.
Figure 4B:
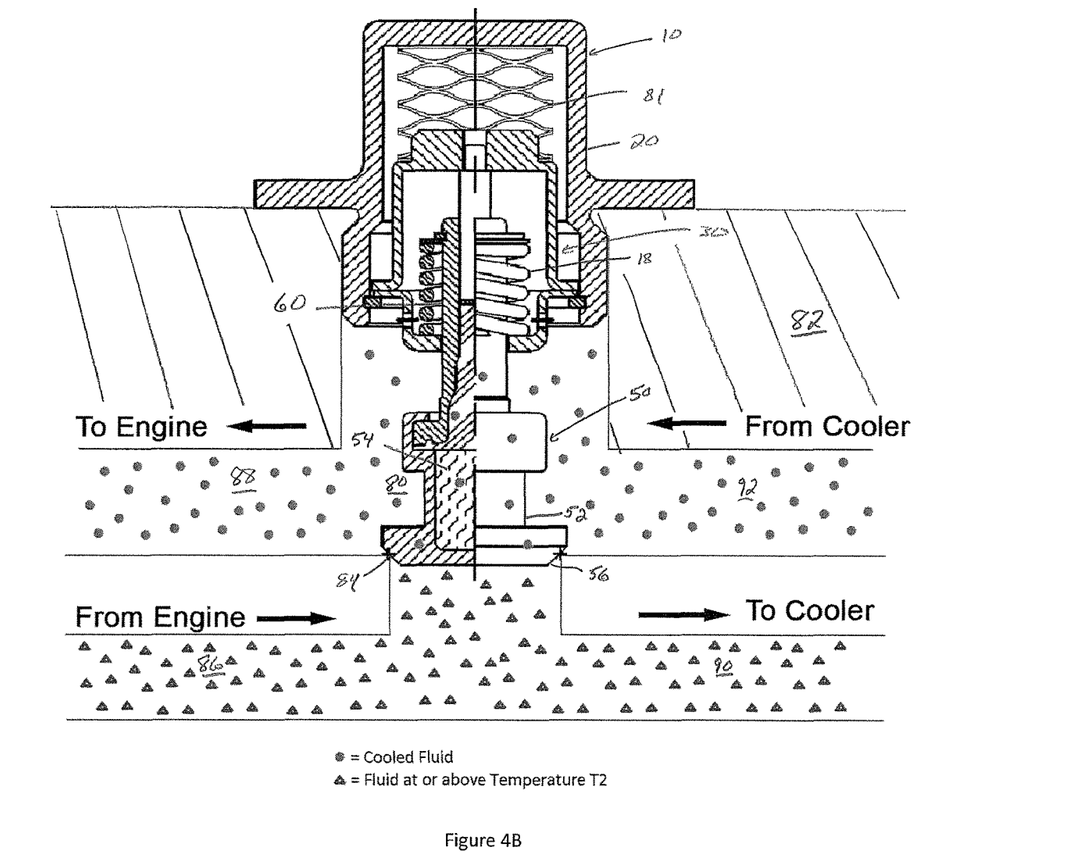
FIG. 4B is a central sectional view of the control valve depicted in FIG. 2 in a closed (hot) state within a temperature control chamber.

As shown in detail in FIG. 2, a return bias container 30 extends from a container first end 32 to a container second end 34 and encloses interior volume 36. The depicted return bias container 30 comprises a return portion 40 and a relief portion 38 that move independently of one another within the cap 20. Referring to FIG. 1, the interior of relief portion 38 includes an abutment 33 adjacent the container first end 32. A relief lip 39 extends radially away from the longitudinal axis 12 at the end of relief portion 38 opposite the abutment 33. The return portion 40 includes an interior shoulder 35 adjacent the container second end 34. A guide aperture 46 extends through the container second end 34 on the longitudinal axis 12. A return lip 41 extends radially away from the longitudinal axis 12 at the end of return portion 40 opposite the interior shoulder 35. In the assembled embodiment depicted in FIG. 2, the lips 39, 41 are in facing contact. The lips 41, 39 are received within D2 and are movable along longitudinal axis 12. A first retainer 16 limits the axial movement of the lips 39, 41 and holds the return bias container 30 within the cap 20. The retention of the return lip 41 by the first retainer 16, as depicted in FIGS. 4A and 4B, allows the return bias container 30 to extend outside of the cap 20 into chamber 80. This extension allows additional axial length within the chamber 80 for the bias members 14, 18 and actuator 50 as discussed in detail below.

Figure 3:
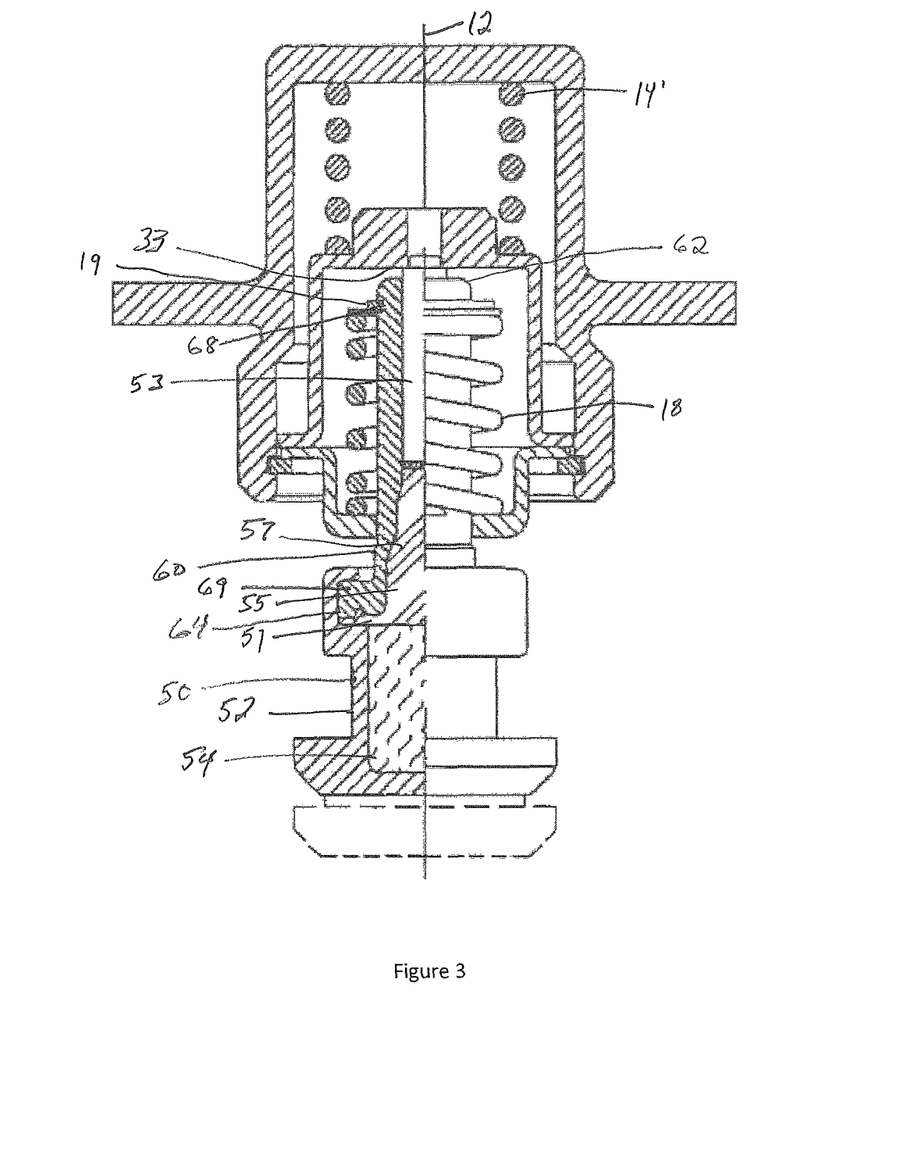
FIG. 3 is a central sectional view of an alternative embodiment of the disclosed control valve with external relief bias member completely assembled.

Referring to FIG. 3, actuator 50 comprises a piston 53, a guide 60, a diaphragm 55, a thermally responsive material 54, and a cup 52. The actuator 50 is coaxial with the longitudinal axis 12. The piston 53, guide 60, and cup 52 may be made from brass, or another suitable material. The diaphragm 55 is usually formed from nitrile rubber and has a generally flat, circular foundation 51 and a plug 57, which extends axially away from the foundation 51. The piston 53 is trapped between the plug 57 and the abutment 33. In the depicted embodiment the piston 53 is stepped to engage the abutment 33. In alternate embodiments, the diaphragm is omitted and the piston contacts the thermally responsive material directly. In these embodiments, seals along the piston may be necessary to contain the thermally responsive material 54.

The thermally responsive material 54 comprises a thermally responsive hydrocarbon wax of the type typically employed in wax thermostatic elements. A specific composition of thermally responsive wax is selected for use in the actuator 50, having very specific characteristics with respect to temperature. The thermally responsive wax is solid below a minimum operating temperature T1, but progressively melts over a predetermined range of operating temperatures from T1 to T2. As the wax progressively transitions from a solid to a liquid between T1 and T2, the volume of the wax increases, exerting pressure on the piston 53.

The guide 60 depicted in FIG. 3 is open at both a first and second end 62, 64 and has a bore 66. In the depicted embodiment, the bore 66 expands radially from the first to second ends 62, 64. The wide portion of bore 66 accommodates the plug 57 and the narrow portion conforms to the diameter of piston 53. The external surface of the guide 60 is generally cylindrical, and guide flange 69 extends adjacent the second end 64. The external surface of guide 60 also contains an annular groove 68 towards the first end 62 to retain a complementary second retainer 19 (depicted in detail in FIG. 1).

Referring to FIG. 2, the cup 52 encloses the thermally responsive material 54 within a generally cup-shaped reservoir. The upper lip of the cup 52 is formed over the guide flange 69 at shoulder 67 and the cup 52 extends to a closed end including valve member 56. The unified guide 60 and cup 52 place the thermally responsive material 54 directly in the fluid flow path, resulting in a control valve that quickly and accurately reacts to the fluid temperature (see FIGS. 4A, 4B). The valve member 56 mates with a complementary valve seat 84 within the surrounding fluid flow system. Incorporating this valve member 56 into the unified guide 60 and cup 52 reduces response time of the control valve 10 in response to the fluid temperature and reduces the hysteresis of control valve 10 by positioning the wax material directly in the fluid flow.

Referring to FIG. 2, relief bias member 14 is trapped between the closed end 22 of cap 20 and relief portion 38. In the depicted embodiment, the relief bias member 14 radially engages a complementary structure on the first end 32 of return bias container 30. In alternate embodiments the relief bias member 14 engages other portions of relief portion 38, including extending around relief portion 38 to engage relief lip 39. The relief bias member 14 exerts a bias force against the return bias container 30 towards the retainer 16. The independent movement of relief portion 38 and return portion 40 allows the relief bias member 14 to accommodate both high pressure and high temperature situations. When the pressure within the chamber 80 exceeds normal parameters, the relief portion 38 and return portion 40 move concurrently against relief bias member 14. When the temperature within the chamber 80 exceeds normal parameters, the piston 53 urges the relief portion 38 further away from return portion 40, overcoming the bias force of relief bias member 14.

Referring to FIGS. 4A and 4B, placing the relief bias member 14 outside of the side wall 23 of the housing allows the control valve 10 to be used in compact assemblies that require large displacement of the valve member 56 relative to the length of the control valve within the chamber 80. In the depicted embodiment, the desired valve displacement 94 is 0.165 inches and the minimum internal length 96 of the control valve 10 is 1.235 inches. This minimum internal length 96 occurs at T1 and the valve displacement 94 occurs at temperature T2. In the depicted embodiment, the operating temperatures T1 and T2 are 230° F. and 245° F., respectively. The overall length 98 of the control valve 10 at temperature T1, as depicted in FIG. 2, is 1.994 inches. This results in an exposed length 99 of 0.759 inches of the control valve 10 outside of side wall 23. In the depicted embodiment the ratio of the actuator 50 throw or valve displacement 94 to the minimum internal length 96 is at least 0.13.

The depicted relief bias member 14 is a stacked wave spring, but other bias members may be used. FIG. 3 depicts an alternate embodiment of control valve 10, wherein the relief bias member 14' is a traditional coil spring. A return bias member 18 surrounds the external surface of actuator 50. The return bias member 18 is axially trapped between the interior shoulder 35 of the return portion 40 and the second retainer 19. The return bias member 18 exerts a bias force against the second retainer 19 urging the piston 53 toward a cold/retracted position within the guide 60 as shown in FIG. 4A. Referring to FIG. 1, in some embodiments a washer 71 is placed between the return bias member 18 and the second retainer 19 to provide a wider radial support for the return bias member 18.

FIG. 4A depicts the control valve 10 in a fully open (cold) state. Fluid at or below temperature T1 enters the chamber 80 from engine outlet 86. In the depicted cold state, the valve is open, allowing fluid to flow around the actuator 50 and into engine inlet 88. In this open state, most of the fluid at or below temperature T1 does not enter the cooler inlet 90 or cooler outlet 92 because there is a higher pressure differential compared to the engine inlet 88. In the depicted embodiment, as long as the valve member 56 is not sealed against valve seat 84, some fluid will flow directly from the engine outlet 86 to the engine inlet 88, bypassing the cooler. As the temperature of the fluid flowing into chamber 80 increases, the thermally responsive material 54 expands, pushing the diaphragm 55 and piston 53 in the direction away from the cup 52. The force of the piston 53 against the abutment 33 eventually overcomes the bias force of the return bias member 18 and the valve member 56 moves in the direction away from the cap 20 until the valve member 56 engages the valve seat 84. The bias force of the return bias member 18 returns the actuator 50 to the fully open (cold) state if the temperature decreases from above T1.

The closed (hot) state of the valve 10 is depicted in FIG. 4B. In the depicted closed state, fluid at or above temperature T2 flows from the engine outlet 86 directly into cooler inlet 90. The cooler (not depicted) decreases the temperature of the fluid which returns to the chamber 80 through cooler outlet 92. In the depicted closed state, valve member 56 is fully engaged with valve seat 84 and the cooled fluid flows from the cooler outlet 92 around the actuator 50 and into the engine inlet 88. As the temperature of the fluid supplied from cooler outlet 92 changes from T2 to T1, the thermally responsive material 54 contracts and the return bias member 18 moves the guide 60 and cup 52 away from the valve seat 84.

As the temperature of the fluid delivered to the chamber 80 from the engine outlet 86 increases from below or at temperature T1 to at or above temperature T2, the actuator 50 responds by moving the valve member 56 towards valve seat 84. As the temperature of the fluid delivered to the chamber 80 from the cooler outlet 92 decreases, the actuator 50 responds by moving the valve member 56 away from the valve seat 84. The movement of the valve member 56 as the actuator 50 extends is not identical to the movement when the actuator 50 contracts. The difference between these two movement curves relative to the temperature of the fluid is the hysteresis of the control valve 10. The structure of the actuator 50, relative to chamber 80, minimizes this hysteresis and allows for predictable and accurate movement of valve member 56 in response to the temperature of fluid being returned to the engine by placing the wax directly in the path of fluid returning from the cooler. In one embodiment, temperatures T1 and T2 are chosen as the operating range of the control valve 10. Above T2 and below T1 the actuator 50 responds minimally to changes in fluid temperature.

The relief bias member 81 accommodates extension of the actuator 50 at temperatures above T2 and further axial movement of return bias container 30 when pressure within the chamber 80 is too high. If the temperature within the regulating chamber 80 continues to increase beyond T2 when the control valve 10 is already in the closed state, the thermally responsive material 54 will continue to expand at a slow rate. Eventually, the force of the actuator 50 on the relief portion 38 will overcome the bias force of the relief bias member 81 and the return bias container 30 moves further into the cap 20 to prevent excessive pressure on valve seat 84. This relief state is also valuable when the pressure of the fluid delivered to the cooler inlet 90 is too high or when there are other failures that cause the actuator 20 to stick in the extended position. The fluid flowing from the engine outlet 86 to the cooler inlet 90 will apply a force to valve member 56, lifting it from the valve seat 84 when the bias force of relief bias member 81 is overcome. This additional movement prevents damage to the cooler and the regulating chamber 80. The relief bias member 81 returns the control valve 10 to the fully open position once the high temperature or pressure subsides or the other elements are repaired.

The invention claimed is:

1. A thermally actuated flow control valve for use in an aperture of a housing, the aperture opening into a flow of fluid within the housing, wherein said flow control valve comprises:

a cap extending from a closed end to an open end and defining an interior cavity surrounding a longitudinal axis;

a return bias container at least partially within said cavity and axially movable therein, said return bias container defining an interior volume with an abutment at a return bias container first end and an interior shoulder defining a guide aperture at a return bias container second end facing away from said closed end of said cap, said return bias container first end and said return bias container second end being movable independent of each other;

a relief bias member between the closed end of said cap and said return bias container first end, said relief bias member exerting a relief bias force urging said return bias container away from said closed end of said cap;

a first retainer securing said return bias container within said cavity in an operational position, said abutment movable within said cavity away from said interior shoulder and toward said closed end of said cap to a relief position;

an actuator including a cup containing material having a volume that changes with temperature, a guide attached to said cup defining a bore open at a guide end facing away from the cup, and a piston axially movable in said bore and arranged to project from said guide end, said cup including a valve member, said piston responsive to pressure generated by changes in the volume of said material, said guide extending into said return bias container through said guide aperture with said piston in contact with said abutment and including a second retainer adjacent said guide end, and said valve member situated outside of said cavity;

a return bias member extending within said return bias container between said second retainer and said interior shoulder, said return bias member exerting a return bias force urging said guide toward said abutment, wherein a first pre-determined increase in the temperature of said material results in a pressure on said piston sufficient to overcome said return bias force and project said valve member away from said cap from a cold position to a hot position.

2. The self-controlled thermally actuated flow-control valve assembly of claim 1, wherein said return bias container comprises a separate relief portion and a separate return portion, said first end of said return bias container being included on said relief portion and said second end of said return bias container being included on said return portion.

3. The self-controlled thermally actuated flow-control valve assembly of claim 2, wherein said separate relief portion includes a radially extending relief lip and said separate return portion includes a radially extending return lip, said relief lip and said return lip move independently along the longitudinal axis within an interior diameter of said cap.

4. The self-controlled thermally actuated flow-control valve assembly of claim 3, wherein said relief lip is in facing contact with said return lip.

5. The self-controlled thermally actuated flow-control valve assembly of claim 1, further comprising a washer between said second retainer and said guide.

6. The self-controlled thermally actuated flow-control valve assembly of claim 1, wherein said cap further comprises a flange extending radially outwards from an outer wall of said cap between said open and closed ends.

7. A fluid cooling system comprising:
a housing having an interior defined by a wall having an aperture, the interior defining a temperature control chamber having an engine outlet to a cooler, an engine inlet from a cooler, and a bypass passage with a valve seat between the engine outlet and engine inlet;

a thermally actuated flow control valve mounted in said aperture, said control valve comprising:

a cap extending from a closed end on said exterior side of said housing to an open end on said interior side of said housing and defining an interior cavity surrounding a longitudinal axis, a return bias container at least partially within said cavity and axially moveable therein, said return bias container extending from an abutment at a first end to a shoulder at a second end, said second end having an actuator aperture radially aligned with said longitudinal axis, said first end and said second end being movable independent of each other, an actuator extending from a closed end defining a valve member to an open end with a guide opening, said actuator containing a material having a volume that changes with temperature, and a piston that protrudes from said guide opening;

a return bias member mounted to an external diameter of said actuator and trapped within said return bias container by said shoulder, said return bias container exerting a return bias force urging said actuator away from said cap; and a relief bias member trapped between said abutment and an inside surface of said closed end of said cap, said relief bias member exerting a relief bias force urging said return bias container away from said closed end of said cap;

wherein a first pre-determined increase in the temperature of said material results in a first variable pressure on said piston sufficient to overcome said return bias force and project said valve member away from said cap from a cold position to a hot position and an increase in temperature beyond said first pre-determined increase in temperature of said material results in a second variable pressure on said piston greater than said first variable pressure, said second variable pressure compressing said relief bias member; and wherein at temperatures below the hot position the bypass passage is open, in the hot position the valve member mates with the valve seat and the bypass passage is closed, and at temperatures above the hot position said abutment moves from said operational position to said relief position and said valve member remains in contact with the valve seat.

8. The fluid cooling system of claim 7, wherein at temperatures below the hot position the fluid flow path through the bypass passage has a pressure differential that is less than the pressure differential across any other fluid flow path in the temperature control chamber.

9. The fluid cooling system of claim 7, wherein said abutment is outside of the wall.

10. The self-controlled thermally actuated flow-control valve assembly of claim 1, wherein the difference in location along the longitudinal axis of said valve member between the hot and cold positions defines a valve displacement, the distance between the aperture and the location of said valve member in the hot position along the longitudinal axis defines a minimum internal length, and the ratio of the valve displacement to the minimum internal length is 0.13.

11. The fluid cooling system of claim 7, wherein the difference in location along the longitudinal axis of said valve member between the hot and cold positions defines a valve displacement, the distance between the wall and the location of said valve member in the hot position along the longitudinal axis defines a minimum internal length, and the ratio of the valve displacement to the minimum internal length is 0.13.

12. A thermally actuated flow control valve for use in an aperture of a housing, the aperture opening into a flow of fluid within the housing, wherein said flow control valve comprises:

a cap extending from a closed end to an open end and defining an interior cavity surrounding a longitudinal axis;

a return bias container at least partially within said cavity and axially movable therein, said return bias container defining an interior volume with an abutment at a return bias container first end and an interior shoulder defining a guide aperture at a return bias container second end facing away from said closed end of said cap, said return bias container first end and said return bias container second end being movable independent of each other, said return bias container first end having a first radially extending lip and said return bias container second end having a second radially extending lip;

a relief bias member between the closed end of said cap and said return bias container first end, said relief bias member exerting a relief bias force urging said return bias container away from said closed end of said cap;

a first retainer securing said return bias container within said cavity in an operational position, said abutment movable within said cavity away from said interior shoulder and toward said closed end of said cap to a relief position;

an actuator including a cup containing material having a volume that changes with temperature, a guide attached to said cup defining a bore open at a guide end facing away from the cup, and a piston axially movable in said bore and arranged to project from said guide end, said cup including a valve member opposite said guide, said piston responsive to pressure generated by changes in the volume of said material, said guide extending into said return bias container through said guide aperture with said piston in contact with said abutment and including a second retainer adjacent said guide end, and said valve member situated outside of said cavity;

a return bias member within said return bias container between said second retainer and said interior shoulder, said return bias member exerting a return bias force urging said guide toward said abutment, wherein a first pre-determined increase in the temperature of said material results in a pressure on said piston sufficient to overcome said return bias force and project said valve member away from said cap from a cold position to a hot position and said radially extending lips are in facing contact unless the valve member is in the hot position and temperature increases beyond said first pre-determined increase in temperature of said material.

13. The self-controlled thermally actuated flow-control valve assembly of claim 3, wherein said first retainer limits the axial movement of the first and second radially extending lips and holds the return bias container within said cavity.

14. The fluid cooling system of claim 7, wherein when said valve member is in the hot position and pressure within the chamber exceeds a pre-determined pressure, the first and second ends of the return bias container move concurrently against the relief bias member allowing the valve member to move away from the valve seat and open the aperture.

15. The fluid cooling system of claim 7, wherein when said valve member is in the hot position and temperature increases beyond said first pre-determined increase in temperature of said material, the piston urges the first end of the return bias container away from the second end of the return bias container allowing the valve member to stay engaged with the valve seat and keep the aperture closed.

16. The self-controlled thermally actuated flow-control valve assembly of claim 12, wherein said cap further comprises a flange extending radially outwards from an outer wall of said cap between said open and closed ends.

17. The self-controlled thermally actuated flow-control valve assembly of claim 12, wherein the thermally actuated flow-control valve assembly is mounted in an aperture of a housing defining a temperature control chamber and when said valve member is in the hot position and pressure within the chamber exceeds a pre-determined pressure, the first and second ends of the return bias container move concurrently against the relief bias member allowing the valve member to move away from a valve seat and open the aperture.

18. The self-controlled thermally actuated flow-control valve assembly of claim 12, wherein said first retainer limits the axial movement of the first and second radially extending lips and holds the return bias container within said cavity.

* * * * *